United States Patent [19]

Trask

[11] 4,021,737

[45] May 3, 1977

[54] SYSTEM FOR PROCESSING AND TRANSMITTING AUDIO SIGNALS RECEIVED FROM A TELEVISION SET FOR REPRODUCTION BY A HIGH FIDELITY FM RECEIVER

[76] Inventor: Burdick S. Trask, 5043 Marietta Ave., Sherman Oaks, Calif. 19423

[22] Filed: June 4, 1975

[21] Appl. No.: 583,750

[52] U.S. Cl. .................................... 325/36; 325/7; 325/11; 325/315; 332/16 T; 332/29 M; 358/189
[51] Int. Cl.² ........................................ H04B 1/00
[58] Field of Search ............................ 325/9–11, 325/7, 36, 315, 398, 461, 455, 104, 105, 176, 181, 364, 46; 178/5.8 R, 5.8 A; 179/1 VS, 15 BT; 332/16 T, 20, 29 R, 29 M, 30 R, 30 V; 331/117 R, 177 R

[56] References Cited

UNITED STATES PATENTS

| | | | |
|---|---|---|---|
| 2,407,212 | 9/1946 | Tunick | 325/11 |
| 2,686,221 | 8/1954 | Avins | 178/5.8 R |
| 3,109,991 | 11/1963 | Ocko | 325/46 |
| 3,118,970 | 1/1964 | Silver | 178/5.8 R |
| 3,259,689 | 7/1966 | Sienkiewicz | 178/5.8 R |
| 3,296,378 | 1/1967 | Fish, Jr. et al. | 179/15 BT |
| 3,427,543 | 2/1969 | Kenichi | 325/11 |
| 3,821,649 | 6/1974 | Grosjean | 325/398 |
| 3,896,386 | 7/1975 | Ohsawa | 325/398 |

OTHER PUBLICATIONS

"TV Sound Tuner", Radio Electronics, pp. 46–48, June 1957.

Primary Examiner—Robert L. Griffin
Assistant Examiner—Jin F. Ng
Attorney, Agent, or Firm—Fraser and Bogucki

[57] ABSTRACT

An audio signal coupling and processing system utilizes the electronics and speakers of a high fidelity system for reproduction of TV audio without direct connection between the television set and the high fidelity system. Partially processed FM signals of fixed center frequency radiated from the audio IF section of the television receiver are sensed by the system which processes the signals and transmits them for receipt by an FM receiver within the high fidelity system, the transmitted signals having a nominal strength allowing clear reception by the FM receiver without violating broadcasting regulations. The system includes a first antenna tuned to receive the radiated FM audio signals from the television receiver, circuitry for demodulating, de-emphasizing and then pre-emphasizing the sensed FM audio signals, an FM modulator for frequency modulating about a carrier frequency at a selected point within the 88–108 megahertz band, and a second antenna for transmitting the resulting frequency modulated signal to the FM receiver. The FM modulator utilizes an unbiased transistor to provide a variable capacitance to the frequency determining coil of an oscillator, and the system includes a circuit for indicating whether the FM audio signals received by the first antenna are of at least minimum strength.

4 Claims, 4 Drawing Figures

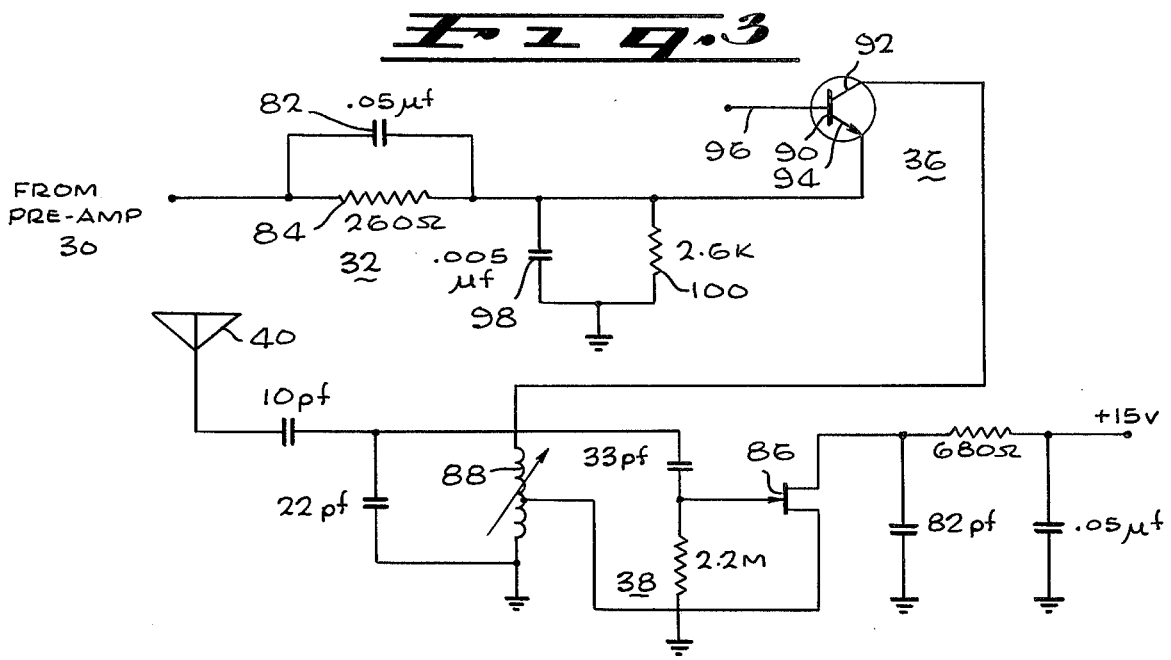

4,021,737

SYSTEM FOR PROCESSING AND TRANSMITTING AUDIO SIGNALS RECEIVED FROM A TELEVISION SET FOR REPRODUCTION BY A HIGH FIDELITY FM RECEIVER

BACKGROUND OF THE INVENTION

1. Field of the Invention

The present invention relates to audio signal coupling and processing systems for sensing partially processed audio signals within a television receiver and processing and transmitting such signals for receipt by a high fidelity system so that the electronics and speakers of the high fidelity system can be used to reproduce the TV audio without direct connection between the TV set and the high fidelity system.

2. History of the Prior Art

Despite continued improvements in the size and quality of both black and white and color television pictures, it is felt by many that the sound reproduced by television sets is rather disappointing. This is due principally to the rather inexpensive electronics and the small speakers of low quality used in even the most expensive console TV sets. Conversely a high fidelity system which may be located in the vicinity of the television set is typically provided with a relatively expensive, high quality speaker system and accompanying electronics including an FM receiver and an amplifier. It is unfortunate if not wasteful that such good equipment cannot be used to reproduce the television audio in a way which does not involve very expensive equipment or annoying direct coupling betwen the TV set and the high fidelity system. For example, it is known to couple the speaker leads from the TV set to the speakers within the high fidelity system using wires. Such connection requires access to the inside of both the TV set and the high fidelity system and poses the further problem of where to place and how to conceal the connecting wires. Furthermore while use of the speakers in the high fidelity system rather than those in the TV set provides for considerably improved sound, the electronics of the TV set rather than those of the high fidelity system are used to process the audio signals, thereby detracting from the quality of the sound reproduction. An alternative approach has been to provide the high fidelity system with a special FM tuner which can be tuned to receive the audio portions of the TV signals transmitted to the TV set. In addition to being very expensive, such tuners must be retuned to a different frequency each time the channel is changed on the TV set.

Accordingly it would be advantageous to provide a relatively simple and inexpensive system for using a high fidelity system to reproduce the TV sound without any connection between or any modification to the television set and the high fidelity system. It would also be highly desirable to provide a system for transmission of the audio signals from the television set to locations remote from the television set where such signals can be used in a variety of ways. For example it would be desirable to be able to reproduce the television sound through a high quality headphone set so as to afford the listener the benefits of a rich, full, high fidelity sound while at the same time isolating nearby people from the television sound.

BRIEF SUMMARY OF THE INVENTION

These and other objects are accomplished in accordance with the invention by an audio signal coupling and processing system which rsponds to partially processed audio signals of fixed center frequency within the television set by processing and transmitting the signals for receipt by a high fidelity system. The invention takes advantage of the fixed difference between the audio and video carrier frequencies of each channel in intercarrier type television receivers by using an antenna tuned to a fixed frequency for sensing signals at that frequency radiated by the audio IF section of the TV set for each of the various channels. The sensed signals are amplified prior to being demodulated and de-emphasized. The signals are then pre-emphasized in accordance with standard FM broadcast practice prior to being frequency modulated about a selected carrier frequency within the commercial FM band of 88–108 megahertz. The resulting FM signal is then transmitted by an antenna at a signal strength which is strong enough to allow for clear reception by an adjacent FM receiver within the high fidelity system and yet weak enough to comply with broadcasting regulations.

The FM modulator preferably includes an oscillator having an inductive coil for determining the frequency of oscillation thereof and a transistor having its collector coupled to the inductive coil, its emitter coupled to receive the signals to be modulated and an unbiased base which is floating or otherwise uncoupled from any source of potential. This causes the capacitance of the transistor to vary in direct relation with the frequency of the signal to be modulated, thereby varying the frequency of the oscillator accordingly.

Audio transmission systems in accordance with the invention may be provided with circuitry for determining whether the radiated FM audio signals from the audio IF section of the television set are of minimum acceptable strength. Such circuitry includes a transistor normally biased into conduction and coupled to an indicator lamp as well as a diode coupled to act as a rectifier in conjunction with the transistor. In the absence of an FM audio signal of minimum amplitude, the noise which is otherwise present is sensed by the rectifying diode, causing the transistor to be biased into non-conduction and thereby preventing the indicator light from glowing. When an FM audio signal of at least the minimum amplitude is present, a quieting effect takes place thereby effectively removing the noise from the rectifying diode and allowing the transistor to be biased into conduction to turn on the indicator lamp.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 3 is a schematic diagram of a further portion of the system of FIG. 1; and

FIG. 4 is a schematic diagram of a still further portion of the system of FIG. 1.

DETAILED DESCRIPTION

Figure 1:
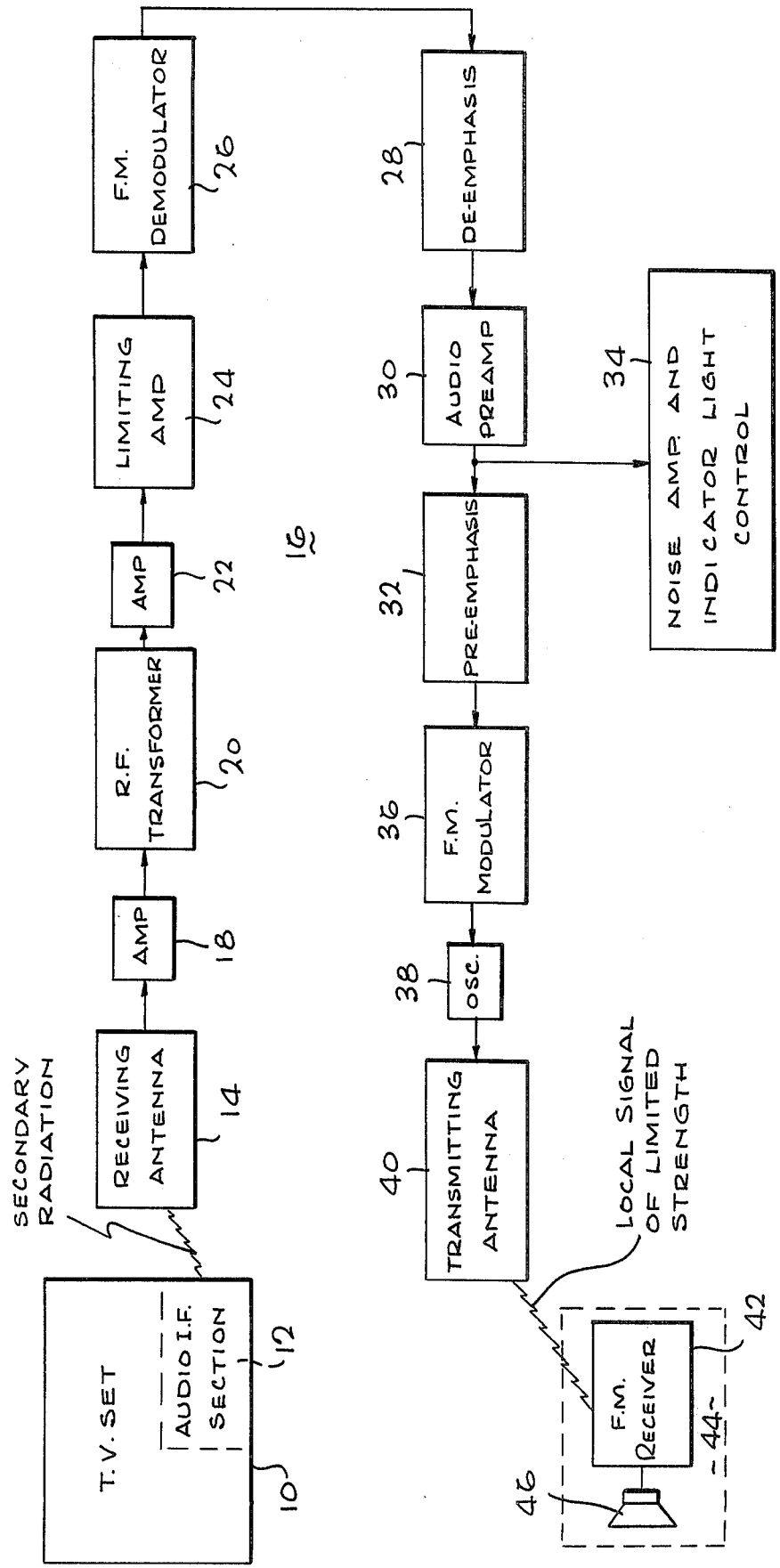
FIG. 1 is a block diagram of an audio signal coupling and processing system in accordance with the invention.

As shown in FIG. 1 a conventional TV receiver or set 10 includes an audio IF section 12. In intercarrier type television receivers there is a constant difference of 4.5 megahertz between the carrier frequencies of the audio and video signals of each channel. The audio IF section 12 responds to the incoming signals received by the TV set 10 by producing an audio FM signal having a carrier frequency of 4.5 megahertz. This frequency is the same for each channel. This signal is then processed by other electronics within the TV set 10 so as to eventually produce a signal which is applied to one or more speakers within the TV set 10 to reproduce the sound. Because of the rather poor quality of the electronics and the relative low quality and small size of the speaker the reproduced sound is of low fidelity and is otherwise lacking in richness and quality.

The present invention takes advantage of the fact that the audio IF section 12 produces a 4.5 megahertz audio FM signal for each television channel and the fact that such signal is radiated in varying degrees to the outside of the TV set 10. By placing a closely tuned receiving antenna 14 in the vicinity of the TV set 10 the audio FM signals of 4.5 megahertz carrier frequency in the form of secondary radiation from the audio IF section 12 are sensed to the exclusion of all other signals in the TV set 10. The receiving antenna 14 forms a part of an audio signal coupling and processing system 16 in accordance with the invention. The system 16 is contained within a relatively small, compact housing which can be placed on top of most TV sets or otherwise located adjacent the TV set without any need for modifying the TV set or even opening the TV set.

The audio FM signals sensed by the receiving antenna 14 are amplified by an amplifier 18, tuned to the center frequency of 4.5 megahertz, prior to being applied to an RF transformer 20. The transformer 20 is a tuned circuit which provides selectivity. Both the primary and the secondary are turned to 4.5 megahertz so as to exclude signals of other frequencies.

Signals from the RF transformer 20 are provided with further 4.5 megahertz amplification by an amplifier 22 prior to being applied to a limiting amplifier 24 associated with a quadrature type FM demodulator 26. The limiting amplifier 24 squares the waveform of signals from the amplifier 22 prior to demodulation by the demodulator 26. A de-emphasis circuit 28 de-emphasizes the pre-emphasized TV audio signals. Consequently the signal at the output of the de-emphasis; circuit 28 is both demodulated and de-emphasized.

Signals at the output of the de-emphasis circuit 28 are applied to an audio preamplifier 30 associated with a pre-emphasis circuit 32 and a noise amplifier and indicator light control 34. The signals from the de-emphasis circuit 28 are pre-emphasized for compatibility with standard FM broadcasting by the pre-emphasis circuit 32 before and after amplification by the preamplifier 30. The noise amplifier and indicator light control 34 provides a visible indication of whether the radiated signals from the audio If section 12 sensed by the receiving antenna 14 are of at least minimum acceptable amplitude. As described hereafter in connection with FIG. 4 the control 34 includes a transistor normally biased into conduction and coupled to an inicator lamp as well as a diode coupled to act as a rectifier in conjunction with the transistor. In the absence of an audio FM signal of minimum amplitude, the noise which is otherwise present is sensed by the rectifying diode, causing the transistor to be biased into non-conduction and thereby preventing the indicator light from glowing. When an audio FM signal of at least the minimum amplitude is present, a quieting effect takes place, thereby effectively removing the noise from the rectifying diode and allowing the transistor to be biased into conduction to turn on the indicator lamp. The failure of the indicator lamp to turn on signals the absence of an audio FM signal of minimum acceptable amplitude. This situation may be remedied such as by experimenting with different locations of the system 16 to determine where the strongest radiated signal can be picked up.

The pre-emphasized signal at the output of the pre-emphasis circuit 32 is frequency modulated about a base or carrier frequency within the commercial FM band of 88–108 megahertz by an FM modulator 36. As described hereafter in connection with FIG. 3 the FM modulator 36 advantageously comprises an unbiased transistor coupled to provide a variable capacitance in response to the frequency of the signals at the output of the pre-emphasis circuit 32. The variable capacitance is presented to a fequency determining inductive coil within an oscillator 38. The FM modulated signal is applied to a transmitting antenna 40. The antenna 40 transmits the signal for local reception in the immediate vicinity of the system 16 and the TV set 10 so as to comply with broadcasting regulations and avoid interference with other broadcasted signals. In the present example the antenna 40 radiates a signal having a strength which is no greater than 50 microvolts at a distance of 50 feet. However this signal is strong enough to provide clear reception within an FM receiver 42 located resonably close to the TV set 10. The FM receiver 42 comprises a part of a high fidelity system 44 together with a loudspeaker system 46. The TV audio signal received by the FM receiver 42 is amplified and otherwise processed by the high quality electronics typically present in the high fidelity system 44 and is converted into sound by the speaker system 46 which is also typically of high quality. Accordingly the benefits of rich, full, high fidelity, high quality TV audio can be enjoyed without any connection between or modification of either the TV set 10 or the high fidelity system 44.

Figure 2:
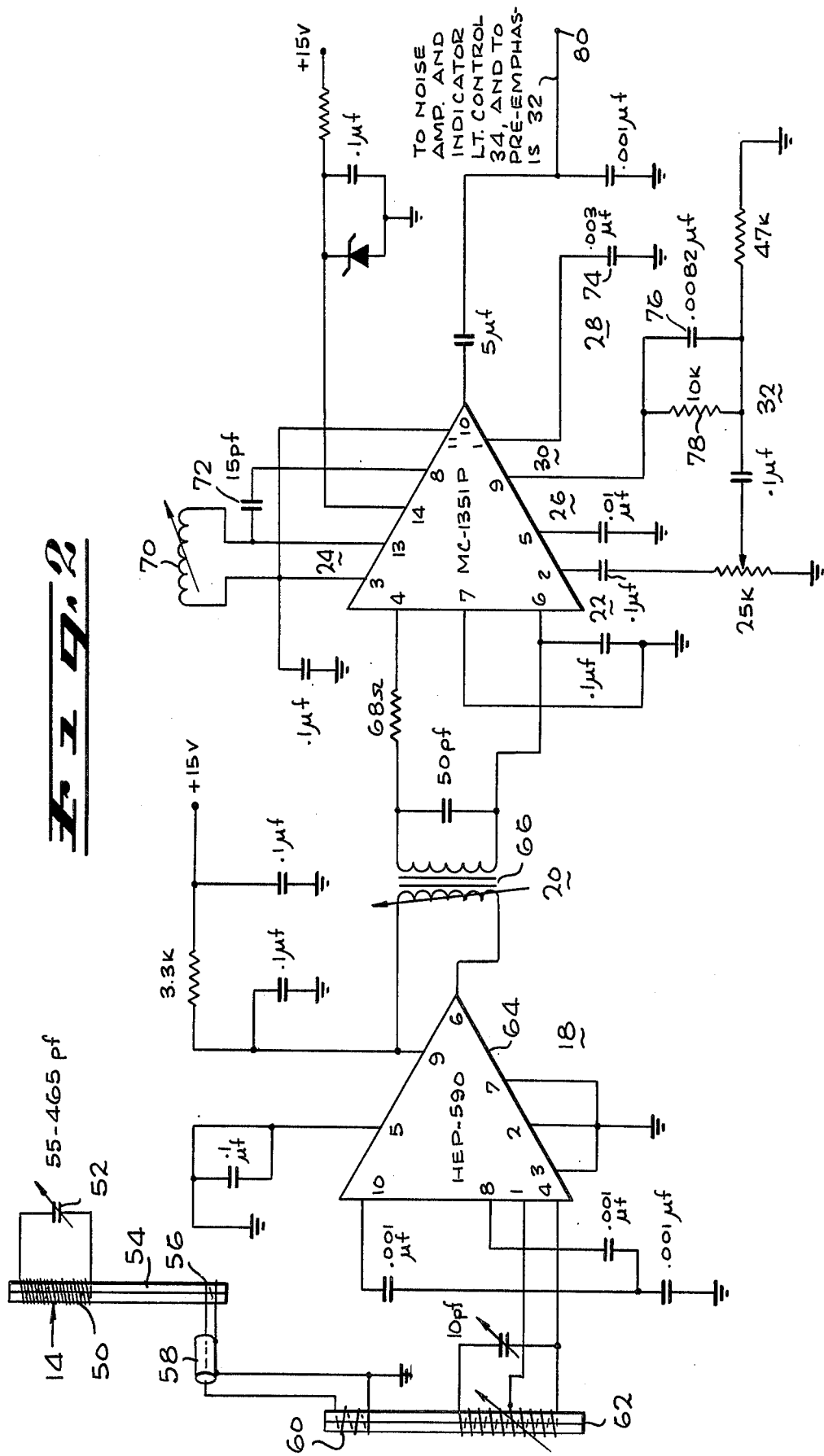
FIG. 2 is a schematic diagram of a portion of the system of FIG. 1.

A portion of the system 16 of FIG. 1 is shown schematically in FIG. 2. As shown in FIG. 2 the receiving antenna 14 comprises a coil 50 and a trimmer capacitor 52. The antenna 14 is tuned to resonate in response to signals of 4.5 megahertz frequency to the exclusion of other frequencies. In the present example the coil 50 comprises 22 turns of No. 18 plastic coated wire on a ferrite rod 54 which is three-eighths inch in diameter and 5-½ inches long. A second coil 56 wound around the rod 54 is coupled to one end of a coaxial cable 58. In the present example the second coil 56 comprises two turns and the cable 58 is RG 5911 coaxial cable approximately 3 feet in length. The opposite end of the cable 58 is coupled via a 2 two turn coil 60 to a ferrite loopstick 62.

The signals sensed by the receiving antenna 14 and passed to the ferrite loopstick 62 are amplified by the amplifier 18 comprising an integrated circuit 64. The circuit 64 provides approximately 26 db of amplifiction for signals of 4.5 megahertz carrier frequency. Signals from the output of the circuit 64 are applied to an intermediate frequency transformer 66 coupled to function as the RF transformer 20. As previously noted the transformer 66 is a tuned circuit providing selectivity. Both the primary and the secondary of the transformer 66 are turned to 4.5 megahertz.

The amplifier 22, the limiting amplifier 24, the FM demodulator 26, the de-emphasis circuit 28, the audio preamplifier 30 and a portion of the pre-emphasis circuit 32 are comprised of an integrated circuit 68 and the associated circuitry shown in FIG. 2. Signals from the transformer 20 entering the integrated circuit 68 are amplified in a stage comprising the amplifier 22, then passed through a stage comprising the limiting amplifier 24 prior to being demodulated. A variable inductive coil 70 and a capacitor 72 comprise a phase shifting circuit which makes quadrature detection of the FM signals possible. A capacitor 74 coupled between pin No. 1 of the integrated circuit 68 and ground comprises the de-emphasis circuit 68 and provides the necessary de-emphasis for the pre-emphasized TV audio signal. The resulting flat audio signal is fed back into a preamplifier section of the integrated circuit 68 defining the audio preamplifier 30 after being attenuated and partly pre-emphasized by a part of the pre-emphasis circuit 32 including a capacitor 76 and a resistor 78. This pre-emphasis provides compatibility with standard FM broadcast practice which requires a 75 microsecond pre-emphasis of broadcast signals. The demodulated, de-emphasized and partly pre-emphasized signals at a termainal 80 comprising the output of the audio preamplifier 30 are applied to a portion of the pre-emphasis circuit 32 shown in FIG. 3 together with the FM modulator 36, the oscillator 38 and the transmitting antenna 40. Such signals are further pre-emphasized by circuitry including a capacitor 82 and a resistor 84. The pre-emphasis circuits 32 of FIGS. 2 and 3 together with the design of the FM modulator 36 enable the system 16 in accordance with the invention to exhibit a frequency response of ± 3 $db$ over a frequency range of 60–10,000 hertz.

The oscillator 38 includes a field effect transistor 86 and a coil 88. The coil 88 determines the frequency of oscillation of the "cathode tap" oscillator which in the present example is modified for use with the field effect transistor and is tuned to a nominal center frequency of 89 megahertz. The modulating element within the FM modulator 36 comprises an unbiased NPN transistor 90. The transistor 90 has a collector terminal 92 coupled to the coil 88 within the oscillator 38. An emitter terminal 94 is coupled to receive the signals from the preamplifier 30 and the pre-emphasis circuit 32. A base terminal 96 of the transistor 90 is not coupled to any source of reference potential but is instead allowed to "float". This enables the transistor 90 to act as a double diode the capacitance of which varies in direct proportion to the frequency of the audio voltage applied to the emitter terminal 94. The parallel combination of a capacitor 98 and a resistor 100 is coupled between the emitter terminal 94 and ground to provide a return path. The coil 88 has the one end thereof coupled to the collector terminal 92 of the transistor 90 and the other end thereof coupled to ground.

Tests have shown that a very small audio voltage (less than 1 volt, peak-to-peak) at the emitter terminal 94 is necessary to provide full (± 75 kilohertz) deviation required for high quality FM transmission. Oscilloscope observations of the waveform at the output terminals of an FM receiver have shown no significant distortion.

The transmitting antenna 40 and the power of the oscillator 38 are adjusted to limit the strength of the transmitted signal to the range permitted by Federal regulations. Specifically the transmitted signal is limited to 50 microvolts or less at a distance of 50 feet from the transmitting antenna 40.

The noise amplifier and indicator light control 34 is illustrated in FIG. 4. A portion of the audio voltage developed in the audio preamplifier 30 is fed to a noise amplifier in the form of an integrated cicruit 110. When the audio FM signal sensed by the receiving antenna 14 is below a minimum acceptable amplitude, the audio voltage provided to the integrated circuit 110 consists primarily of noise. This noise is amplified by the integrated circuit 110, is further amplified by a field effect transistor 112, and is rectified by a diode 114. The negative voltage developed by the diode 114 is applied to a control transistor 116 which is normally biased into conduction by a positive power supply voltage applied across a network of resistors 118 and 120. Since the negative voltage developed by the integrated circuit 110, the field effect transistor 112 and the diode 114 is greater than the positive voltage from the power supply, the transistor 116 is biased into nonconduction. The failure of an associated lamp 122 to illuminate signals the absence of an audio FM signal of minimum acceptable amplitude at the receiving antenna 14.

When an audio FM signal of at least minimum acceptable amplitude is received by the receiving antenna 14, the resulting signal from the preamplifier 30 at the input of the integrated circuit 110 is sufficient to provide a quieting effect. This leaves little or no noise signal to be amplified by the field effect transistor 112 and rectified by the diode 114. Accordingly no negative voltage is applied to the base of the control transistor 116, and the transistor 116 is therefore biased into conduction by the power supply voltage across the resistors 118 and 120. Conduction of the transistor 116 causes the lamp 122 to illuminate, indicating the presence of an audio FM signal of at least minimum acceptable amplitude. The small amount of audio voltage which is applied to the integrated circuit 110 to cancel the noise varies sufficiently so as to cause the lamp 122 to flicker. This provides an even further indication that the lamp is being illuminated in response to an audio FM signal of at least minimum acceptable amplitude.

It has been found that the audio IF sections of most television sets provide secondary radiation of the audio signals at a sufficient level so as to be considered of at least minimum acceptable amplitude without any modification of the television set. In a few instances where the secondary radiation may prove to be too weak, particularly in the case of solid state TV sets, it may be necessary to modify the TV set by adding some means for increasing the level of the secondary radiation. This may be accomplished, for example, by attaching a six inch wire to the output of one of the IF transformers in such a TV set.

While television audio is presently monaural and therefore is of necessity sensed, processed, transmitted and reproduced in accordance with the invention in monaural form, it will be understood by those skilled in the art that minor modification of systems in accordance with the invention will permit stereo reproduction at such time as television audio may be transmitted in stereo. This is a particularly attractive arrangement since most high fidelity systems equipped with an FM receiver are capable of stereophonic as well as monaural reproduction.

Still further options are possible with systems in accordance with the invention. For example the FM receiver may be combined with a pair of high quality headphones to enable the TV viewer to enjoy high quality TV audio while at the same time isolating others in the vicinity from the TV sound. Such an arrangement has applicability to a variety of different situations. For example where television is used for classroom instruction the students can be provided with one or more FM receivers and associated headsets to permit one or a selected number of students to listen to the TV sound to the exclusion of other students in the same room.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An audio signal coupling and processing system comprising:
    first antenna means for receiving signals of frequency within a defined narrow band to the exclusion of signals of frequency outside the defined narrow band, said first antenna means being operative to receive audio FM signals radiated from the IF section of a television receiver;
    an FM demodulator coupled to the first antenna means for demodulating signals received by the first antenna means;
    an FM modulator coupled to the FM demodulator and operative to frequency modulate signals demodulated by the FM demodulator about a carrier frequency within a commercial FM band, said FM modulator comprising a transistor having emitter, base and collector terminals, the base terminal being uncoupled from any source of potential, means coupling the emitter terminal to the FM demodulator, an oscillator having inductor means for determining the frequency of oscillation, means coupling the collector terminal to one end of the inductor means, and means coupled between the emitter terminal and an opposite end of the inductor means for providing a voltage difference between the emitter terminal and the opposite end of the inductor means; and
    second antenna means coupled to the FM modulator and operative to transmit signals which are frequency modulated by the FM modulator for receipt by an FM receiver responsive to the commercial FM band.

2. An FM modulator comprising:
    a transistor having emitter, base and collector terminals, the base terminal being uncoupled from any source of potential;
    an input terminal coupled to receive signals to be modulated;
    means coupling the emitter terminal to the input terminal;
    an oscillator having inductor means for determining the frequency of oscillation;
    means coupling the collector terminal to one end of the inductor means; and
    means coupled between the emitter terminal and an opposite end of the inductor means for providing a voltage difference between the emitter terminal and the opposite end of the inductor means.

3. The invention defined in claim 2, wherein the inductor means comprises a coil having opposite ends defining said one end and said opposite end of the inductor means and the oscillator has capacitor means coupled between the opposite ends of the coil.

4. The invention defined in claim 3, wherein the means for providing a voltage difference includes the parallel combination of a capacitor and a resistor.

* * * * *